(12) United States Patent
Smith et al.

(10) Patent No.: US 11,197,416 B2
(45) Date of Patent: Dec. 14, 2021

(54) CONTROL SYSTEM FOR AN ADJUSTABLE DEFLECTOR

(71) Applicant: CNH Industrial America LLC, New Holland, PA (US)

(72) Inventors: Brent Smith, Lititz, PA (US); Mark Dilts, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 407 days.

(21) Appl. No.: 16/396,986

(22) Filed: Apr. 29, 2019

(65) Prior Publication Data

US 2020/0337237 A1 Oct. 29, 2020

(51) Int. Cl.
*A01D 41/12* (2006.01)
*F15B 11/16* (2006.01)
*F15B 11/042* (2006.01)

(52) U.S. Cl.
CPC ........ *A01D 41/1243* (2013.01); *F15B 11/042* (2013.01); *F15B 11/16* (2013.01); *F15B 2211/427* (2013.01); *F15B 2211/6336* (2013.01); *F15B 2211/75* (2013.01); *F15B 2211/78* (2013.01)

(58) Field of Classification Search
CPC . F15B 11/16; F15B 11/042; F15B 2211/6336; F15B 2211/75; F15B 2211/427; A01D 41/1243; A01D 41/127
See application file for complete search history.

(56) References Cited

U.S. PATENT DOCUMENTS

| 4,383,536 | A | 5/1983 | Delorme | |
|---|---|---|---|---|
| 4,875,889 | A | 10/1989 | Hagerer et al. | |
| 5,569,081 | A | 10/1996 | Baumgarten et al. | |
| 7,186,179 | B1 * | 3/2007 | Anderson | A01F 7/067 460/111 |
| 7,306,174 | B2 | 12/2007 | Pearson et al. | |
| 7,467,997 | B2 | 12/2008 | Niermann et al. | |
| 7,473,169 | B2 | 1/2009 | Isaac | |
| 7,485,035 | B1 * | 2/2009 | Yde | A01D 41/1243 460/111 |
| 8,463,510 | B2 | 6/2013 | Knapp | |
| 8,961,284 | B2 * | 2/2015 | Wagner | A01D 41/1243 460/112 |
| 9,516,812 | B2 | 12/2016 | Baumgarten et al. | |
| 9,699,967 | B2 | 7/2017 | Palla et al. | |
| 9,763,384 | B2 | 9/2017 | Hessler | |
| 9,949,434 | B2 | 4/2018 | Baes et al. | |
| 2014/0171160 | A1 | 6/2014 | Ricketts et al. | |

FOREIGN PATENT DOCUMENTS

EP 1570726 A1 9/2005

\* cited by examiner

*Primary Examiner* — Abiy Teka
(74) *Attorney, Agent, or Firm* — Peter Zacharias; Patrick Sheldrake

(57) ABSTRACT

A control system and method for controlling the positioning of an adjustable deflector plate employed in a harvesting combine to adjust a side-to-side flow of crop residue to spreaders associated with the combine and the distribution thereby. The deflector plate is operably extendable into the flow of crop residue to redirect crop residue impinging the deflector plate. The deflector plate is adjusted based upon a comparison between the open/closed states of valves associated with the control system.

17 Claims, 6 Drawing Sheets

CONTROL SYSTEM FOR AN ADJUSTABLE DEFLECTOR

FIELD OF THE INVENTION

The present invention relates generally to a control system, and the method of use thereof, for controlling the positioning of an adjustable deflector employed to transition or redirect a flow of crop residue from an axially arranged threshing or separating system of an agricultural combine to and through a chopper assembly and to a crop residue spreading system for distributing the residue onto a field, and more particularly, to a control system that is responsive to changes in the amounts of crop residue being distributed by side-by-side spreader assemblies of the crop residue spreading system to alter the positioning of the adjustable deflector to change the flow of crop residue and to more closely balance and equalize the amounts of crop residue being distributed by side-by-side spreader assemblies of the crop residue distribution system.

BACKGROUND OF THE INVENTION

As is described in U.S. Pat. No. 7,485,035 to CNH America LLC, which is incorporated by reference herein in its entirety, axially arranged rotary threshing or separating systems have long been in use in agricultural combines for threshing crops to separate grain from crop residue, also referred to as material other than grain (MOG). Such axially arranged systems typically include at least one cylindrical rotor rotated within a concave or cage, the rotor and surrounding concave being oriented so as to extend forwardly to rearwardly within the combine.

In operation, crop material is fed or directed into a circumferential passage between the rotor and the concave, hereinafter referred to as a rotor residue passage, and is carried rearwardly along a generally helical path in such passage by the rotation of the rotor as grain is threshed from the crop material. The flow of crop residue or MOG remaining between the rotor and concave after threshing is typically discharged or expelled by the rotating rotor at a rear or downstream end of the rotor and the rotor residue passage in a generally downward, or a downward and sidewardly, direction, in what is a continuation of the helical path of movement of the crop residue within the rotor residue passage between the rotor and concave.

Such flow thus proceeds from the rotor residue passage into a discharge opening at the downstream end of the rotor and into a further discharge passage that extends downwardly and somewhat rearwardly into a crop residue treatment and distribution system located below and rearwardly of the rear end of the threshing system. Such crop residue treatment and distribution system typically includes a rotary beater or chopper or other apparatus, hereinafter generally referred to as a rotary residue chopper, that processes the residue to reduce it to smaller pieces and propels such finer residue rearwardly within a rear end of the combine for either discharge from the combine through a rear opening onto a field or into a spreader assembly, hereinafter referred to more simply as a spreader, for distribution thereby, such as in a swath on the field. In many typical applications, the spreader may include and utilize a pair of counter-rotating spreader head assemblies, typically driven by hydraulic spreader or drive motors, disposed in a side-by-side arrangement, to spread the crop residue flow that is being provided thereto from the rotary residue chopper.

Due to the nature of operation of the rotor, the design of the rotor and concave, and the helical movement of the crop residue within the rotor residue passage, the flow of crop residue from the rotor residue passage into the discharge opening is often greater on the downward sweep side of the rotor than on the upward sweep side, as a consequence of which the resulting crop residue flow across the width of the discharge opening is often uneven across the width of the discharge opening. Such uneven flow has often, in the past, been permitted to proceed through the discharge passage to the rotary residue chopper and therethrough to the crop residue spreading system.

When crop residue is to be spread over a field, it is often considered desirable that the crop residue be distributed as evenly or uniformly over the field as possible. Such uniformity of distribution is desirable because uneven crop residue distribution on a field can lead to temperature and moisture gradients detrimental to even growth of future crops on the field. Uneven distribution can make it difficult for crops to utilize nutrients and can impact the effectiveness of agricultural chemicals. Moreover, large discontinuities of crop residue can lead to plugging and other functional problems with tillage and/or planting equipment.

One factor that has been found to significantly affect the ability of a spreader to distribute crop residue evenly or uniformly over a field has been the transverse or side-to-side variation in the crop residue inflow into and through the rotary residue chopper and to the spreader. In such regard, it has been found that when the amount of crop residue presented at or to one side of the rotary residue chopper has been about equal to the amount of crop residue presented at or to the other side of the rotary residue chopper, a more even and uniform distribution of crop residue in a swath on a field can be achieved by the side-by-side operation of the spreader head assemblies. On the other hand, when the presented amounts are unequal or unbalanced, the distribution onto the field is more uneven and less uniform.

It has also been found that the side-to-side introduction of crop residue from the rotor into the discharge opening and to the crop residue chopper can be affected by a variety of variables and conditions. Generally, residue from different crops, such as wheat and corn, will flow differently, and different rotor rotation speeds will typically be used for different crops, as is described in greater detail in U.S. Pat. No. 7,485,035.

Due at least in part to the above described variables and conditions, it has been observed that the transition of crop residue flow from the threshing system to the crop residue treatment and distribution system can vary significantly from harvesting operation to harvesting operation, and even during the course of a given harvesting operation. In particular, the side-to-side distribution of the crop residue flow as it proceeds from the rotor residue passage into the discharge opening and towards the rotary residue chopper may often be variable, that is, the flow to one side of the chopper may be heavier than to the other side, such that the chopper will propel more crop residue towards one side of the following spreader, resulting, in turn, in uneven crop residue distribution over a swath on the field being harvested.

Several devices and constructions have been developed in attempts to address the foregoing problems, including the adjustable deflector constructions such as are described in U.S. Pat. Nos. 7,186,179; 7,306,174; and 7,473,169, which are incorporated herein by reference thereto. The deflector constructions of such applications have been positioned with a deflector plate thereof hingedly or pivotally mounted at the downstream end of the rotor, and adjustment thereof to effect a redistribution of the crop residue at such location, upstream from the rotary residue chopper, has generally been effected either manually or by a positioning control system operated by a user.

It has been recognized that, in view of the variability of the crop residue flow in differing situations and with different crops, improved performance and reliability can be achieved by adjusting the position of such a deflector plate from time to time during operation of the combine so as to better balance and equalize the amounts of crop residue being distributed by the side-by-side spreader assemblies of the crop residue spreading system under then-attendant conditions.

To address this recognized need, U.S. Pat. No. 7,485,035 describes an automated control system that is operable to alter the positioning of the adjustable deflector to change the flow of crop residue and to more closely balance and equalize the amounts of crop residue being distributed by side-by-side spreader assemblies of the crop residue distribution system. Such control system includes a plurality of sensors that monitor on a continuous basis side-to-side crop residue flow, an actuator mechanism operable to effect an adjustment in the positioning of the deflector, and a controller assembly operatively connected or coupled to the sensors to receive data signals therefrom as input data and operatively connected or coupled to the actuator mechanism to provide positioning control signals thereto. The crop residue flow is monitored such as by monitoring the operation of the spreader head assemblies, especially such as by monitoring, through the use of pressure transducers, the hydraulic pressures associated with the respective hydraulic motors for the spreader head assemblies.

When the flow of crop residue through the spreader is approximately balanced relative to the spreader head assemblies of the spreader, the respective hydraulic motors will be approximately similarly loaded and the hydraulic pressures associated with such hydraulic motors will be approximately the same. So long as the monitored pressure levels for the respective hydraulic spreader motors remain generally the same, or within some given differential amount, which differential amount may be determined by or a factor of the characteristics of the system and its components or otherwise set or determined by a user, the flow is considered to be in balance, with no adjustment of the positioning of the deflector being necessary. However, if the monitored pressure levels differ by more than the differential amount, the controller assembly will provide to the actuator mechanism an appropriate signal to effect operation by the actuator mechanism to retract or extend the deflector plate to effect a change in the flow of crop residue from the threshing system to and through the rotary residue chopper to the spreader head assemblies of the spreader.

The aforementioned plurality of sensors described in U.S. Pat. No. 7,485,035, which monitor on a continuous basis side-to-side crop residue flow, represent an additional expense. Thus, improvements in monitoring side-to-side crop residue flow are continually sought in the interest of performance and cost, for example.

SUMMARY OF THE INVENTION

According to one aspect of the invention, a control system is provided for controlling the positioning of an adjustable deflector plate employed in a harvesting combine to adjust a side-to-side flow of crop residue to spreaders associated with the combine and the distribution thereby, the deflector plate operably extendable into the flow of crop residue to redirect crop residue impinging the deflector plate. The control system comprises a first motor powered by a hydraulic pump to drive a first spreader of the plurality of spreaders; a first valve associated with a fluid passage extending between the first motor and the hydraulic pump for controlling the flow of fluid to the first motor; a second motor powered by the hydraulic pump to drive a second spreader of the plurality of spreaders; a second valve associated with a fluid passage extending between the second motor and the hydraulic pump for controlling the flow of fluid to the second motor; an actuator operatively connectable to the deflector plate and operable to effect the extension of the deflector plate into the flow of crop residue; and a controller configured to (i) transmit a first control signal to the first valve to control an open/closed state of the first valve so that a speed of the first motor will be either approximately equal to or within a predetermined range of the speed of the second motor, (ii) transmit a second control signal to the second valve to control the open/closed state of the second valve so that a speed of the second motor will be either approximately equal to or within a predetermined range of the speed of the first motor, and (iii) actuate the actuator to effect adjustments in the degree of extension of the deflector plate into the flow of crop residue based upon a comparison between the first control signal and the second control signal.

According to another aspect of the invention, a method of controlling a positioning of an adjustable deflector plate of a harvesting combine is provided, such combine having a plurality of spreaders for distributing therefrom crop residue provided thereto. The method comprises:

powering a first motor by a hydraulic pump to drive a first spreader of the plurality of spreaders;

powering a second motor by the hydraulic pump to drive a second spreader of the plurality of spreaders;

transmitting a first control signal to a first valve associated with a fluid passage extending between the first motor and the hydraulic pump to control an open/closed state of the first valve so that a speed of the first motor will be either approximately equal to or within a predetermined range of the speed of the second motor;

transmitting a second control signal to a second valve associated with a fluid passage extending between the second motor and the hydraulic pump to control the open/closed state of the second valve so that the speed of the second motor will be either approximately equal to or within a predetermined range of the speed of the first motor;

comparing the first and second control signals; and actuating an actuator to effect adjustments in the degree of extension of the deflector plate into the flow of crop residue based upon the comparison between the first and second control signals to adjust and balance a side-to-side flow of crop residue to the spreaders and the distribution thereby.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
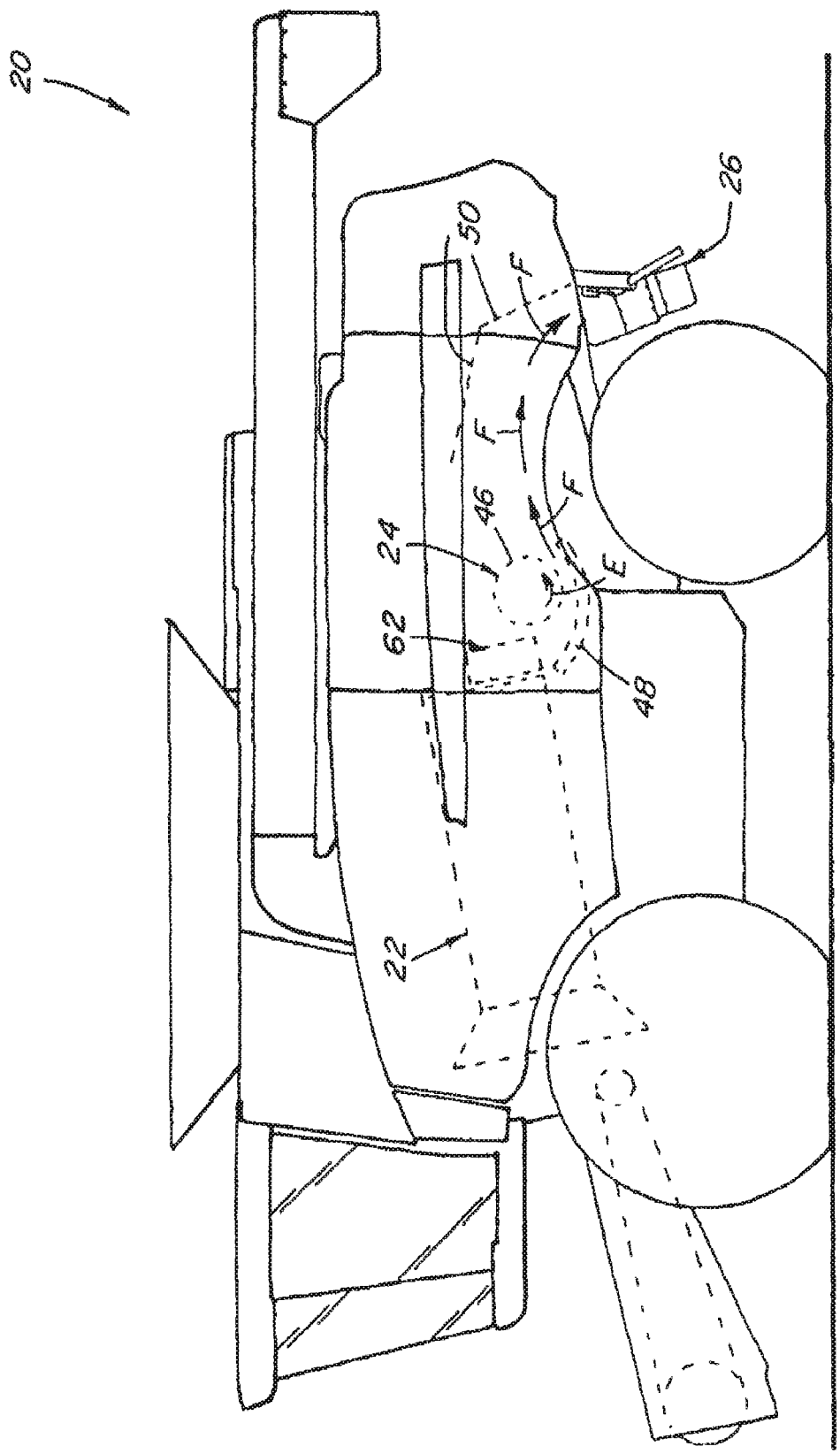
FIG. 1 is a simplified side view of an agricultural combine, illustrating in dotted lines an axially arranged threshing system of the combine, which combine includes an adjustable deflector apparatus for transitioning crop residue flow from the threshing system to a crop residue treatment and distribution system of the combine.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

Referring now to the drawings, as is described in U.S. Pat. No. 7,485,035, FIG. 1 depicts a representative agricultural combine 20 that includes an axially arranged threshing system 22, a rotary residue chopper 24, and a crop residue spreader 26, all of well known construction and operation.

Figure 2:
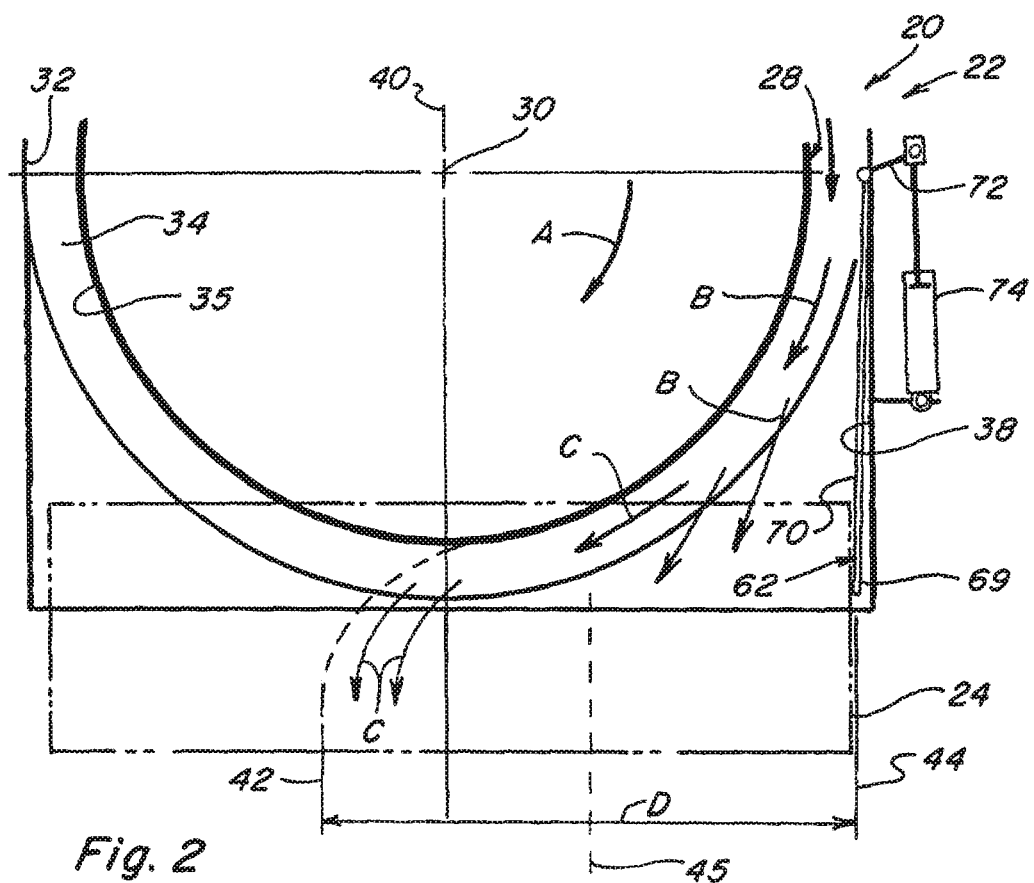
FIG. 2 is a simplified rear view at the rear of the threshing system of the combine of FIG. 1, showing the adjustable deflector apparatus generally abutting a side wall in a non-extended position and illustrating the path of crop residue flow expelled from the threshing system with the deflector plate in such position, with the position of the rotary residue chopper being shown generally in dashed lines.
Figure 3:
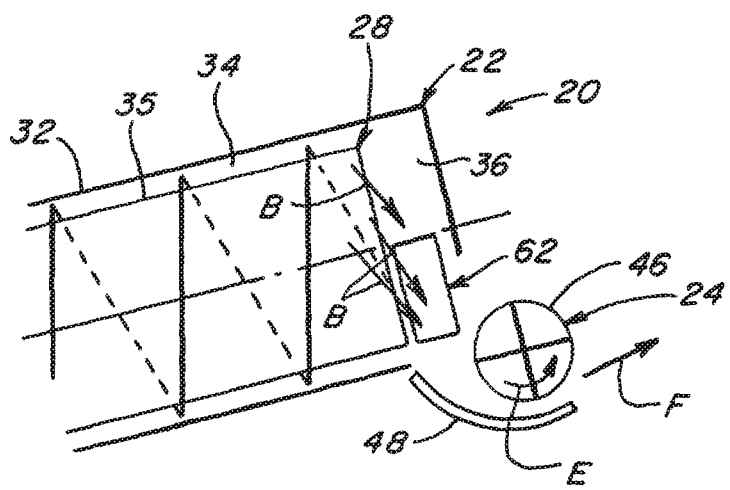
FIG. 3 is a simplified side view of the threshing system, adjustable deflector plate, and rotary residue chopper.

As can be generally and essentially observed from a review and study of FIGS. 1-3, threshing system 22 is axially arranged in that it includes a cylindrical rotor 28 conventionally supported and rotatable in a predetermined direction, with arrow A in FIG. 2 denoting a typical clockwise, or forward, rotation, about a rotational axis 30 therethrough and within a concave 32, for conveying a flow of crop material in a helical flow path through a space 34 extending circumferentially around an outer cylindrical surface 35 of rotor 28 and an inner circumferential surface of concave 32. As the crop material is moved through space 34, the crop, such as grain, legumes, or the like, will be loosened and separated from crop residue such as husk and pods, and carried away therefrom in the well known conventional manner.

As may be best illustrated by FIG. 3, the crop residue will continue along a helical path through space 34, and will be expelled therefrom, as denoted by arrows B, into and through a discharge opening 36, which essentially comprises an extension of space 34 at the downstream end of rotor 28. Some of the flow expelled through discharge opening 36 will tend to be directed more downwardly, as denoted by arrow B on the right hand side of FIG. 2, so as to flow generally downwardly along internal side 38, while other portions of the flow will be directed and/or be carried by rotating rotor 28 and momentum in a transverse direction toward an opposite internal side of combine 20, and will eventually flow, as denoted by arrows C, downwardly toward crop residue distribution system 24.

The consistency of the flow of crop residue, volume thereof, and extent or pattern thereof, will typically vary, and will be a function of a variety of conditions, including, but not limited to, the speed of rotation in direction A of rotor 28, crop type, plant maturity, moisture content, and weather conditions. As an example, rotor speeds can vary between just a few hundred rpm and over a thousand rpm. Wheat and other small grains will typically have relatively small crop residue components, whereas other grains, such as corn, will typically have larger components, such as thick stalk segments, cob fragments, and large leaves.

Typically, regardless of the particular crop being harvested, the downward flow of crop residue will be more to the right-hand side of a front-to-rear extending vertical centerline 40 of both the threshing system 22 and the rotary residue chopper 24, as may be observed in FIG. 2, which centerline will hereinafter be referred to as the system centerline. The sideward extent of such typical downward flow is represented by extent D in FIG. 2, and is generally bounded on the left-hand side by a line 42 extending generally downwardly on the left of centerline 40, and on the right hand side by a line 44 extending generally downwardly near internal side 38, generally centering such flow extent D about a flow centerline 45 that is offset from system centerline 40. The sideward or transverse locations of lines 42 and 44, and thus the transverse extent D of the downward flow, may vary somewhat due to one or more of the above-noted conditions and/or parameters.

Here, it should be noted that rotary residue chopper 24 will typically include a rotary device, such as a beater or chopper 46 (FIG. 3), rotatable in a direction E above a concave pan 48. Beater or chopper 46 typically rotates at a rapid speed, so as to be capable of accelerating and propelling a flow of crop residue rearwardly, as generally denoted by arrows F, within the confines of the rear end of combine 20. The rearward flow of crop residue from the beater or chopper 46 is typically guided and directed by internal panels or shields, generally denoted by shields 50 (FIG. 1), so as to either flow into a crop residue spreader 26 or through a rear opening so as to be deposited directly onto a field.

Figure 4:
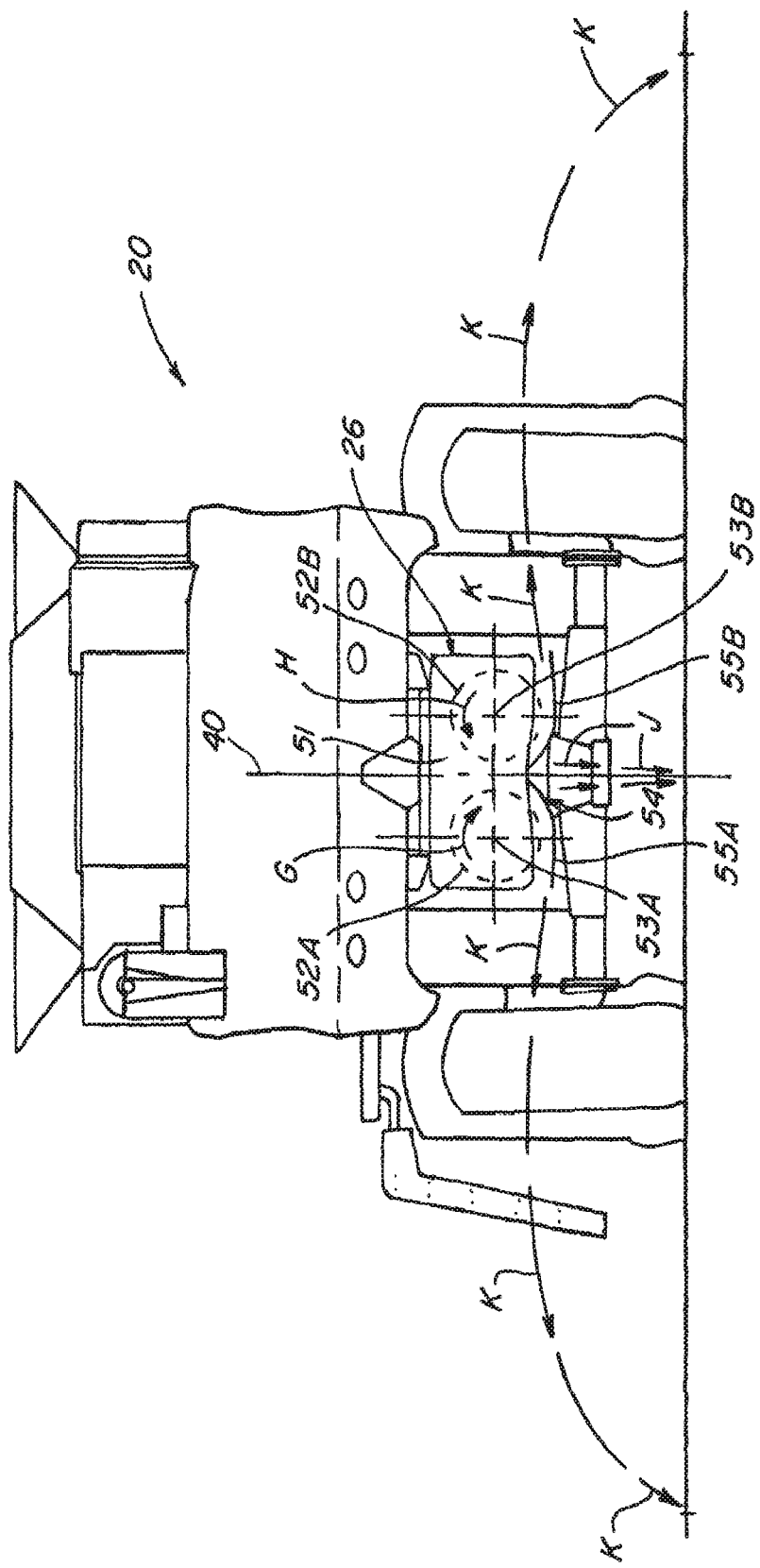
FIG. 4 is a rear view of the combine of FIG. 1, generally depicting a typical crop residue spreading system and certain components thereof as disposed at the rear of the combine.

Typically, a residue spreader 26 to which the crop residue is provided will be operated so as to distribute the crop residue in a layer the width of a header being harvested by combine 20 in a well known manner. In such regard, FIG. 4 depicts one form of a spreader 26 which can be advantageously employed, wherein, for purposes of clarity, certain elements or components associated with the rear or aft portion of the back sheet or back plate of the residue spreader 26 are not necessarily shown. The depicted spreader 26 includes spaced, opposed radial side walls, and a rear wall 51, sometimes referred to as the back sheet or back plate of the spreader, extending therebetween across the width of spreader 26, defining an internal cavity having a forwardly and upwardly facing inlet opening for receiving the residue flow from the rotary residue chopper 24, a pair of side-by-side counter-rotating spreader head assemblies 52A and 52B rotatable in opposite predetermined rotational directions, such as denoted by arrows G and H, about respective rotational axes 53A and 53B, and a flow distributor apparatus 54 disposed within the housing for spreader 26 generally abutting back sheet 51 and having opposed depending wing or arm portions 55A and 55B extending generally beneath portions of the spreader head assemblies 52A and 52B.

As the spreader head assemblies rotate, a portion of the crop residue drops or is propelled generally downwardly, as denoted by arrow J, for distribution on the field behind the combine 20, and other portions are propelled more sidewardly and/or towards the flow distributor 54. Flow distributor 54 serves to further guide and carry portions of the crop residue intercepted thereby further sidewardly outwardly away from spreader 26, as denoted by oppositely directed arrows K, for distribution on the field behind the combine 20.

The spreader head assemblies 52A and 52B, which may also form or include spreader paddles of appropriate sizes and configurations for the uses intended, are rotated by suitable driving elements, such as by conventionally constructed and operable hydraulic motors, as will be further addressed hereinafter, especially with regard to FIG. 8. Alternatively, the spreader head assemblies 52A and 52B may be rotated by an electric motor, belt, or the like, again in well known manners. Rotational axes 53A and 53B extend at least generally in the fore and aft directions, that is, generally forwardly and rearwardly with respect to combine 20, and are generally horizontal or oriented at a small acute angle to horizontal, depending on an orientation or tilt of spreader 26 on combine 20, which can be optionally variable and adjustable in the well known manner.

Other well known spreader constructions, including spreaders that employ counter-rotating spreader head assemblies that rotate about generally vertical axes to propel the crop residue backwardly and sidewardly can also be employed, as can various other forms of drop or like spreaders, to achieve similar or alternative effects.

Regardless of the particular form of spreader utilized, as has been noted hereinabove, it is generally desired that the crop residue be distributed evenly or uniformly over the field, for a variety of reasons. However, heavier flow of crop residue into one side or the other of the rotary residue chopper 24 will result in the beater or chopper 46 thereof propelling more crop residue toward a corresponding side of the following residue spreader 26 and one of the spreader head assemblies 52A or 52B, with the result of the deposit of a heavier layer or mat of crop residue on a corresponding side of a swath over a field. For the reasons set forth above, such uneven deposit of crop residue on a field is undesirable in many instances.

A deflector apparatus addresses such problems and provides a combine operator with the ability to adjust the side-to-side or transverse extent and location of crop residue flow into the crop residue treatment and distribution system of a combine. In FIGS. 2, 5, 6, and 7, a typical deflector apparatus of the type employed for such a purpose is depicted, which deflector apparatus includes an adjustable deflector plate 62 that is disposed to be adjustably movable into and out of the path of at least a portion of the crop residue flow B. Such deflector plate 62 is shown located such that, when it is adjustably positioned to extend into the path of crop residue flow B as in FIGS. 5-7, at least portions of the crop residue flow that would otherwise flow along or close to side 38 impinge or strike deflector plate 62 and, to various extents depending upon the particular positioning of deflector plate 62, are deflected downwardly thereby, as denoted by arrows B1, B2, and B3 in FIGS. 5, 6, and 7, respectively.

Significantly, the downwardly directed crop residue flow, as illustrated by representative arrows B1, B2, and B3, is shifted or moved in a transverse direction in the discharge opening 36, that is, more to the left of internal side 38 in such figures, depending on the transverse position and orientation of deflector plate 62. When FIG. 7 is compared to FIGS. 2, 5, and 6, it is apparent that the farther deflector plate 62 is moved or extended transversely away from side 38, the farther the downwardly directed crop residue flow is shifted in the transverse direction.

Figure 5:
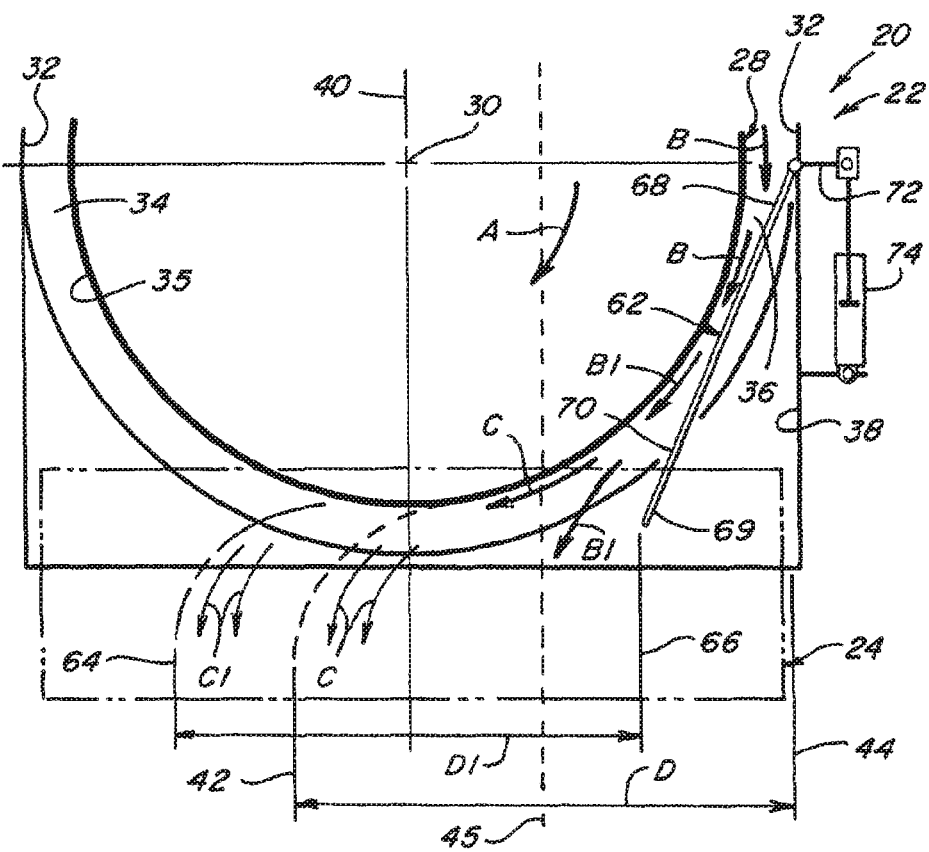
FIG. 5 is a simplified rear view similar to FIG. 2, but showing the adjustable deflector plate partially extended into the flow of crop residue from the threshing system and illustrating the effect of such deflector plate upon the flow.
Figure 6:
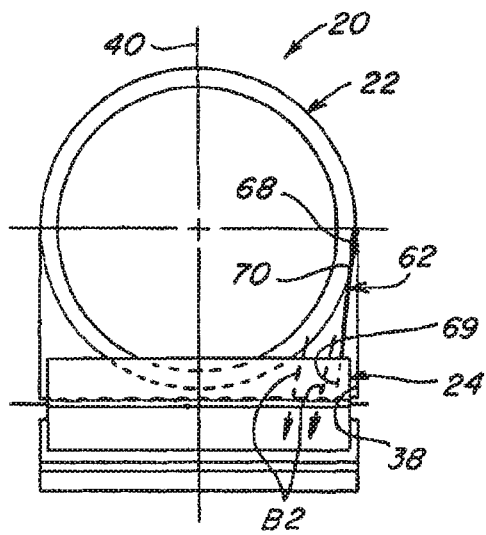
FIG. 6 is a simplified rear view of the threshing system, adjustable deflector plate, and rotary residue chopper, showing the deflector plate in a minimally extended position beside a side of the combine.
Figure 7:
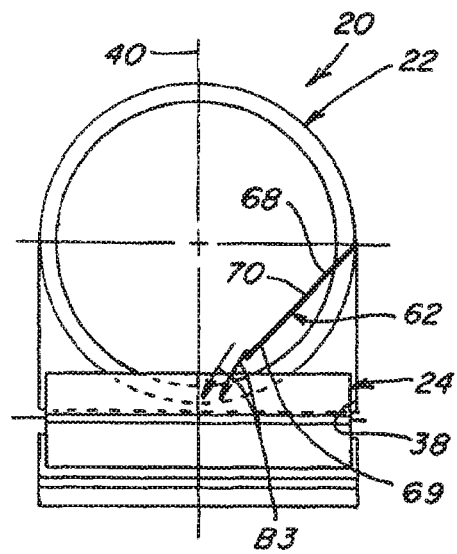
FIG. 7 is another simplified rear end view of the threshing system, adjustable deflector plate, and rotary residue chopper, showing the deflector plate at an alternative, extended position in relation to the side of the combine.

In FIG. 5, deflector plate 62 is shown moved from the position depicted in FIG. 2, to an intermediate position relative to FIGS. 6 and 7, which intermediate position, for purposes of further discussion and illustration, will be treated as being the position that yields the optimal side-to-side distribution of crop residue flow into rotary residue chopper 24 for the attendant harvesting conditions. When such deflector plate 62 is so extended into the flow path B of the crop residue, the crop residue flow path is redirected transversely, with the shifted downwardly directed flow B1 effecting a corresponding transverse shift of downstream portions of such flow, as illustrated by arrows C1. The overall transverse extent of such flow correspondingly moves from extent D, extending between lines 42 and 44, to extent D1, extending between lines 64 and 66. In such a manner, the transverse extent of the flow towards beater or chopper 46 of rotary residue chopper 24 can be moved or shifted laterally by greater or lesser amounts depending upon the extent of the deployment of deflector plate 62 into the path of crop residue flow. The side-to-side distribution of crop residue at the inflow to chopper 46 can thus be adjusted so as, for example, to better align the flow centerline with the system centerline 40 instead of with an offset centerline, such as the centerline 45 for flow extent D.

As is perhaps also best observed in FIG. 5, the typical adjustable deflector plate 62 is typically pivotally or hingedly mounted to combine 20 for pivotal movement through a range of positions, such as represented by the positions shown in FIGS. 2, 5, 6, and 7. Such deflector plate 62 is preferably constructed of a rigid, abrasion resistant material, such as sheet metal or the like, and includes an upper end portion 68 mounted at a suitable location, such as on internal side 38 at the downstream end of rotor 28 of threshing system 22, and includes a lower end portion 69 that extends downwardly from upper end portion 68. Such deflector plate 62 may be adjustably positionable to extend into the path of at least a portion of the flow B of crop residue so that face 70 thereof will be impinged or struck by the flow B so as to deflect such impinging crop residue somewhat sidewardly and downwardly in the above-described manner.

To facilitate pivotal movement of deflector plate 62 relative to internal side 38, upper end portion 68 may typically include or be associated with a pair of pivot arms 72 that extend through appropriate passages in internal side 38 and pivotally connect with an actuator 74 operable for effecting pivotal movement of deflector plate 62 through a range of positions between about those shown in FIGS. 6 and 7.

Actuator 74 is preferably located external to threshing system 22 so as to be outside of the path of the crop residue flow. Such actuator 74 can be any suitable commercially available actuator device or system and is preferably remotely controllable, such as through the control system of the present invention, which may also include an override switch or other control in an operator cab of combine 20, which control system, as will be further discussed hereinafter, may employ a processor based controller or the like for effecting desired pivotal movements of deflector plate 62. In general, actuator 74, which may include systems or mechanism for converting control signals to effect operation thereof, can comprise any suitable actuator device, such as a fluid cylinder, a linear actuator, such as a dashpot or solenoid, a rotary actuator, or the like, operable for effecting the desired movements.

Due at least in part to the variables and conditions discussed hereinabove, the crop residue flow from the threshing system 22 will continue to vary during the course of a crop harvesting operation, as a consequence of which the deflector plate must be repositioned from time to time if a balanced crop residue flow to the spreader 26 is to be maintained.

Figure 8:
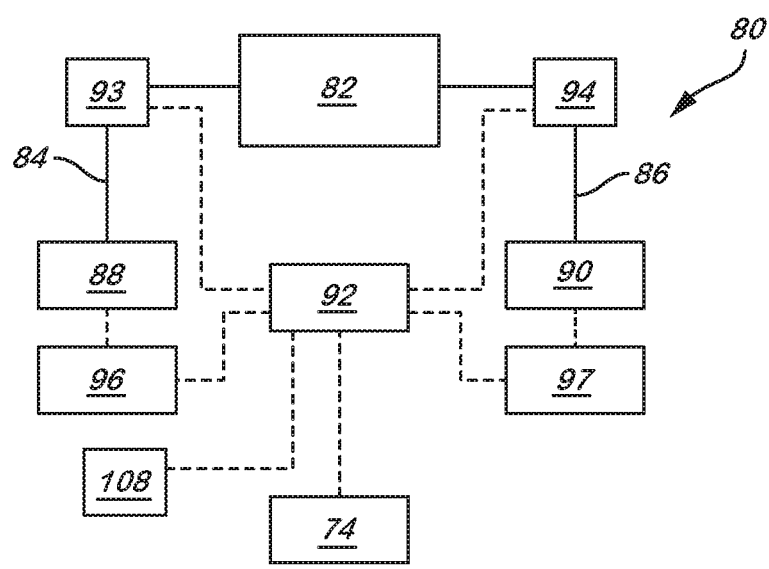
FIG. 8 is a generalized schematic of a preferred form of the control system of the present invention.

In FIG. 8, the solid lines depict hydraulic fluid lines and the broken lines depict signal lines. FIG. 8 depicts a preferred form of a control system 80 for automatedly controlling the positioning and repositioning of the deflector plate 62 over a period of time. Control system 80 generally provides for the automated repositioning of the deflector plate 62 using actuator 74, without the necessity for human manual intervention or action to effect such repositioning, under control of controller 92.

The control system 80 generally includes a hydraulic pump 82, which may be powered by the engine of the combine 20. Hydraulic pump 82 is fluidly connected to power the hydraulic motors 88 and 90, which drive spreader head assemblies 52A and 52B, respectively. One fluid circuit 84 is defined between the pump 82 and the motor 88, and a hydraulic valve 93 is connected to fluid circuit 84 at a location between pump 82 and motor 88 for controlling the amount of hydraulic fluid delivered to motor 88. Similarly, another fluid circuit 86 is defined between the pump 82 and the motor 90, and a hydraulic valve 94 is connected to fluid circuit 86 at a location between pump 82 and motor 90 for controlling the amount of hydraulic fluid delivered to motor 90. The fluid circuits 84 and 86 are disposed in parallel, as opposed to being arranged in series. Speed sensors 96 and 97 are connected to motors 88 and 90, respectively, for sensing the rotational speed of those motors. Speed sensors 96 and 97 may be any type of sensor known in the art that is capable of sensing speed, such as a Hall Effect sensor, optical sensor, proximity sensor, etc. Although only one pump 82 is shown, the control system 80 could include two discrete pumps 82, i.e., one pump for circuit 84 and another pump for circuit 86.

A controller 92 is operatively connected to receive data signals from the speed sensors 96 and 97, and adjust the open/closed state of the valves 93 and 94 to maintain the speed of the motors 88 and 90, respectively, approximately equal or within a specified range. The controller 92 controls the open/closed state of the valves 93 and 94 by transmitting discrete Pulse Width Modulated (PWM) signals to those valves 93 and 94. The PWM signals (or voltages) may also be referred to herein as control signals. The controller 92 is also connected to actuator 74 of deflector plate 62, and transmits a signal to actuator 74 to adjust deflector plate 62.

Preferably, the controller 92 will also have a user input interface, which may be operatively connected to receive operator inputs from an operator input/output (I/O) system 108, which system 108 may include devices such as a keyboard or keypad or other information entry devices, including switch or control knob settings, as well as display devices, to permit an operator to activate, de-activate, and to override the controller, as needs may dictate, or to set or to vary various system parameters, such as the acceptable differential open/closed setting of the valves 93 and 94 allowable without corrective action or delay times to avoid active constant cycling.

Controller 92 may be or include a processing system, including a programmed microprocessor and associated components, or may be a special purpose or like component or assembly, having a data input interface for receiving the data inputs and a control output interface at which the positioning control signals can be provided, and is so designed and configured to be responsive to the data signals being received thereby to produce appropriate positioning control signals to rebalance the crop residue flow between the spreader head assemblies 52A and 52B.

According to this embodiment, the valves 93 and 94 do not have a sensor output to sense their open/closed state. Each valve 93 and 94 is an open loop component which is fed a PWM signal by the controller 92 to set the percentage open/closed (e.g., half open, quarter open, etc.). For each circuit 84 and 86, the speed of the motor 88 and 90 associated with the valve 93 and 94 is transmitted to the controller 92, and the controller 92 controls the open/closed state of the valve 93 and 94, respectively, as a function of the motor speed. Thus, the motor speeds transmitted to the controller 92 are feedback signals, and the controller 92 adjusts the open/closed state of the valves 93 and 94 based upon those feedback signals.

The actual open/closed state of the valves 93 and 94 may be unknown, however, the PWM signal applied to each valve 93 and 94 is known, and, therefore, the difference in PWM signals transmitted by the controller 92 to the valves 93 and 94 is also known. Thus, the difference in the open/closed states of the valves 93 and 94 is known. For example, in order to equalize the speed of the motors 88 and 90, valve 93 may be fed 60% PWM signal by the controller 92 while the valve 94 is fed the remaining proportion of the signal (i.e., 40% PWM signal). The 60%/40% PWM imbalance between the valves 93 and 94 indicates that the valves 93 and 94 have different open/closed states, which indicates that spreader head assemblies 52A and 52B and their respective motors 88 and 90, respectively, are subject to different crop loads.

It should be understood that the system 80 does not measure system pressure, or directly measure valve position to calculate the closed/open states of the valves 93 and 94. Rather, the system 80 infers the closed/open states of the valves 93 and 94 from the PWM control signals transmitted to the valves 93 and 94.

It is noted that due to tolerances between the valves 93 and 94, it is possible that valves 93 and 94 require difference PWM signals under equal crop load conditions to maintain the same speed of the motors 88 and 90 that are connected thereto. For example, valve 93 could normally require 49% PWM while valve 94 normally requires 52% PWM to maintain the same speed of the motors 88 and 90 under equal crop load conditions between those motors. The software of the control system 80 is configured to learn over time and adapt to the bias between the PWM signals for valves 93 and 94 due to tolerances and manufacturing variability.

Referring now to the operation of the control system 80, when the flow amounts of crop residue to the spreader head assemblies 52A and 52B of spreader 26 are approximately equal, as can be achieved by an appropriate positioning of deflector plate 62 in the manner discussed hereinabove, the speed of the hydraulic motors 88 or 90 will be approximately equal and the open/closed setting of the valves 93 and 94 associated with the hydraulic motors 88 and 90 driving such spreader head assemblies 52A and 52B will also be approximately equal. Thus, adjustments to the deflector plate 62 may not be required.

However, if the crop residue flows to the spreader head assemblies 52A or 52B become unbalanced for some reason, such as due to uneven crop growth, and the harvesting thereof across the harvested width, with a greater amount of crop residue flowing to one or the other of the spreader head assemblies 52A or 52B, the system 80 will detect an imbalance in the amounts of crop residue to the spreader head assemblies 52A and 52B of spreader 26.

More particularly, and by way of background, the imbalance will cause speed sensors 96 and 97 to detect difference motor speeds. In order to equalize the motors speeds, the controller 92 will change the PWM signal transmitted to the valves 93 and/or 94, which will adjust the open/closed settings of the valves 93 and/or 94. The fluid within circuits 84 and 86 will flow to the path of least resistance. The pressure on each side of the circuit 84 and 86 is comprised of the pressure drop across the motor ($P_M$) and the pressure drop across the valve ($P_V$). For example, if the first motor 88 is under less load than the second motor 90, then the first motor 88 will have a lower pressure drop (i.e., $P_{M1} < P_{M2}$). Thus, the controller 92 will move the first valve 93 toward the closed position to increase the pressure drop ($P_{V1} > P_{V2}$) until the pressure resulting in the circuits is substantially equal (i.e., $P_{V1} + P_{M1} = P_{V2} + P_{M2}$). This will also equalize the speed of the motors 88 and 90. However, the spreader head assemblies 52A and 52B will still experience on uneven crop load.

The controller 92 will then compare the open/closed setting of the valves 93 and 94 by monitoring the PWM signal transmitted to the valves 93 and 94. A difference in the open/closed setting of the valves 93 and 94 (e.g., half opened vs. quarter opened), as detected by controller 92, implies that spreaders 52A or 52B are under different loads while the motors 88 and 90 are rotating at (or about) the same speeds, which signifies that crop residue is being distributed non-uniformly over the field. The magnitude of the difference in the open/closed setting of the valves 93 and 94, as detected by controller 92 using the PWM signals, implies the magnitude of the load differential.

Controller 92, which is also connected to actuator 74 of deflector plate 62, transmits a signal to actuator 74 to adjust deflector plate 62. Adjusting the deflector plate 62 will equalize the loads on motors 88 and 90, as well as the spreaders 52A and 52B, which signifies that crop residue is being distributed uniformly over the field. The controller 92 will eventually equalize the position settings of valves 93 and 94 in an iterative process as the loads on the motors are equalized by adjusting the deflector plate 62. This process occurs without directly adjusting the speed of the motors 88 and 90.

By appropriate operations of the actuator 74, corrective repositionings of the deflector plate 62 can be effected in the manners heretofore described to alter the crop residue flow path through the combine 20 and its crop residue treatment and distribution system and to redirect the flow so that (i) the flows to the spreader head assemblies 52A and 52B will again be approximately equal, (ii) the speed of the motors 88 and 90 will again be approximately equal, and (iii) the open/closed setting of the valves 93 and 94 associated with the hydraulic motors 88 and 90 will also again be approximately equal.

According to one exemplary embodiment, the general hierarchy of decisions that the controller 92 executes is as follows: (1) control speed of motors 88 and 90 to control the spreader width, (2) sense motor speeds with sensors 96 and 97 and adjust the valves 93 and 94 to drive the motor speed towards setpoints, (3) compare the bias between the two valves 93 and 94 as a corollary to spread distribution, (4) adjust deflector plate 62 using actuator 74 based upon the computed bias to promote even spread distribution, and (5) repeat steps (1) through (4) in a loop during operation of the combine.

Figure 9:
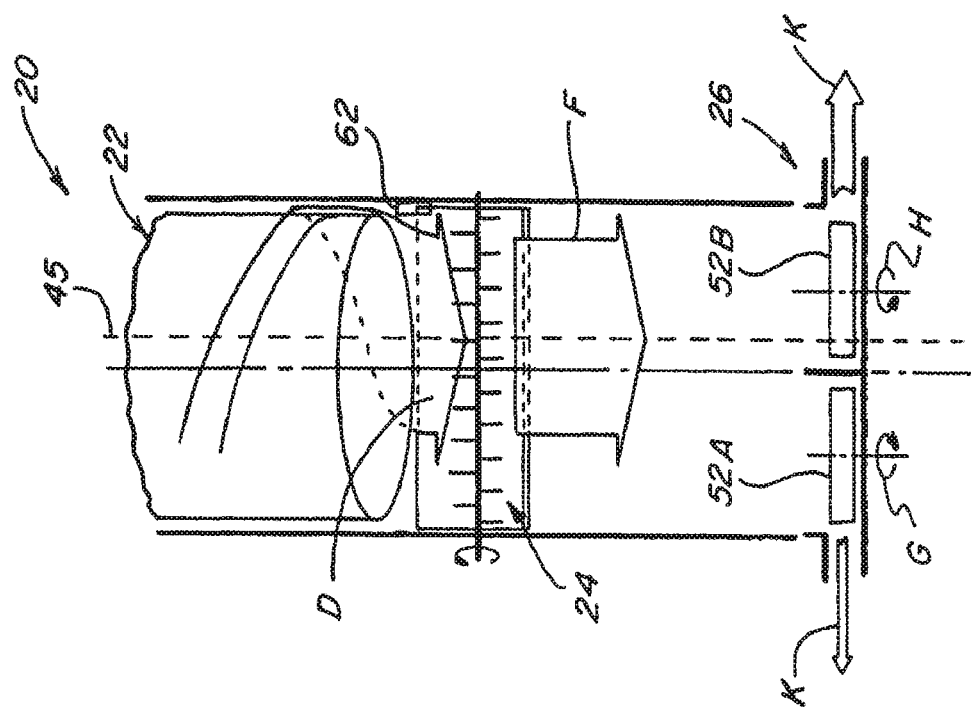
FIG. 9 is a simplified top view of the rear end of a combine, generally showing the threshing system, adjustable deflector plate, rotary residue chopper, and crop residue spreading system of the combine, and illustrating a typical crop residue flow through the rear end of the combine and the distribution thereby when the adjustable deflector plate is in a more retracted position.

Referring now to FIG. 9, such figure generally depicts typical crop residue flow characteristics that have previously been encountered with flow from an axially arranged threshing system 22 of a combine 20 into a rotary residue chopper 24, and from there, into and from a crop residue spreader 26, when the present invention has not been employed or activated and the deflector plate 62 has not been adjusted to effect balanced distribution of crop residue. It can be observed in such figure that flow D from threshing system 22 is centered about the flow centerline 45 which is offset from system centerline 40. With such configuration, the crop residue flow F that is then propelled rearwardly by rotary residue chopper 24 is similarly offset in the same direction and centered about centerline 45. Flow F flows into crop residue spreader 26 in the offset manner, and spreader 26, in turn, propels the crop residue from the rear end of combine 20 in an offset manner, with the heavier distribution being more to the right-hand side in such FIG. 9, as illustrated by the larger arrow K at the right-hand side and the smaller arrow K at the left-hand side. As a result, the crop residue is spread unevenly over a swath of the field.

Figure 10:
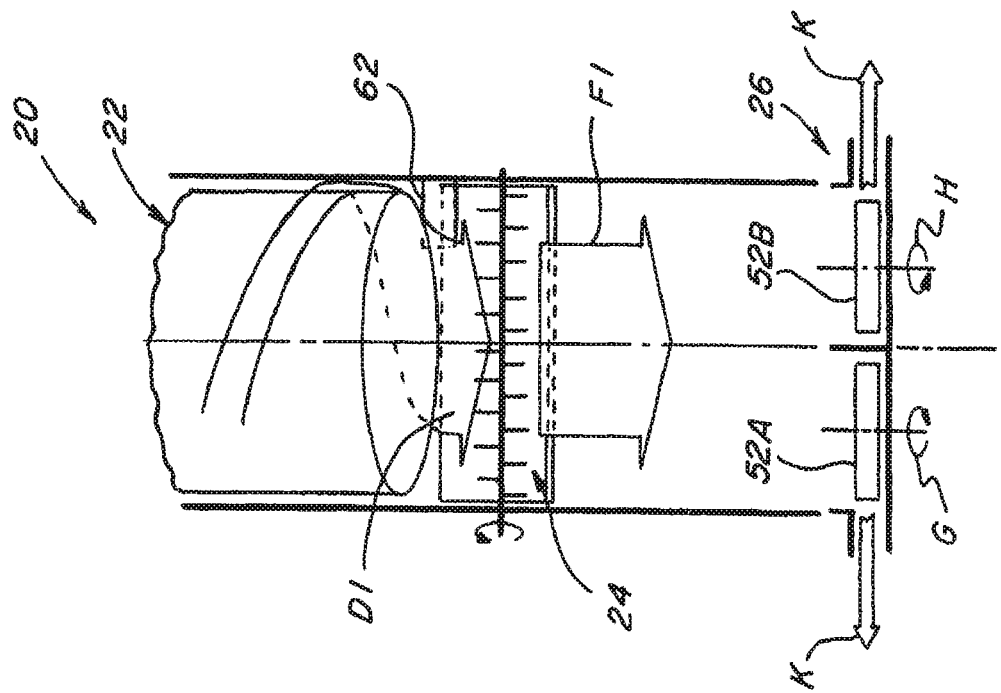
FIG. 10 is a simplified top view of a rear end of the combine, generally showing the threshing system, adjustable deflector plate, rotary residue chopper, and crop residue spreading system of the combine, and illustrating a typical crop residue flow through the rear end of the combine and the distribution thereby when the adjustable deflector plate is in a desired, more extended position.

In contrast, as depicted in FIG. 10, utilization of the present invention results in the automated ongoing repositioning of the deflector plate 62 to produce a deflection of the crop residue into a more centered crop residue flow D1 towards and into rotary residue chopper 24, and the consequent, more centered discharge of crop residue therefrom relative to system centerline 40, as is illustrated by the location of the center of arrow F1. The crop residue flow is therefore provided to spreader 26 in a more centered manner, and so as to be propelled from the rear end of combine 20 in a more centered relationship to system centerline 40, as is illustrated by arrows K which are of approximately the same size.

It should be appreciated that, while the preferred form of the invention has been described hereinabove with reference to hydraulic motors for driving the spreader head assemblies and the use of sensors for sensing the speed of the motors, other embodiments may be employed with various sensors and monitors of other types could be equally as well employed, including position, speed, current, and voltage sensors of various types and monitors disposed to permit determination of the motor or drive loads.

Additionally, the signal connections shown in broken lines in FIG. 8 could be either wired or wireless, including constructions for wireless transmission of RF signals, such as might be employed in and with Bluetooth environments and equipment, hydraulic or pneumatic systems, optical or infrared communications or connections, and mechanical linkages.

In general, when a control system according to the present invention is activated or operated, it will automatedly monitor on an ongoing basis the side-to-side flow of the crop residue to the spreader and will be responsive to detected imbalances in such flow, at least to the extent that a detected imbalance exceeds some given value, to effect a repositioning of an adjustable deflector plate in the path of the crop residue flow to alter and redirect the flow to achieve a more balanced side-to-side flow. Typically, an imbalance will be considered to exist when the loads associated with motors driving side-by-side spreader head assemblies are found to differ, such as may be detected by monitoring the control signals transmitted to the valves 93 and 94 controlling the motors. Preferably, an operator will be able to vary the given value as needs dictate and will also be able to override the control system as may become necessary or desirable.

Additionally, in order to alleviate the problem of constant cycling in the repositioning of the deflector plate 62, the controller 92 may be so designed and configured to require the passage of some minimum period of time after a repositioning of the deflector plate 62 before the production of a new positioning control signal. Optionally, a user may be permitted to alter the minimum time delay by entry of time delay setting information at the operator input/output (I/O) system 108 and by the communication of such time delay setting information to user input interface 106 of controller 92. Information can be coupled from operator input/output (I/O) system 108 to user input interface 106 of controller 92 in manners similar to those addressed hereinabove relative to the position settings of valves 93 and 94.

It is to be understood that the operational steps are performed by the controller 92 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 92 described herein is implemented in software code or instructions which are tangibly stored on a tangible computer readable medium. Upon loading and executing such software code or instructions by the controller 92, the controller 92 may perform any of the functionality of the controller 92 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

In light of all the foregoing, it should thus be apparent to those skilled in the art that there has been shown and described a control system for automatedly controlling the positioning of an adjustable deflector in a harvesting combine and the method of operation of such control system. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A control system for controlling the positioning of an adjustable deflector plate employed in a harvesting combine to adjust a side-to-side flow of crop residue to spreaders associated with the combine and the distribution thereby, the deflector plate operably extendable into the flow of crop residue to redirect crop residue impinging the deflector plate, said control system comprising:
   a first motor powered by a hydraulic pump to drive a first spreader of the plurality of spreaders;
   a first valve associated with a fluid passage extending between the first motor and the hydraulic pump for controlling the flow of fluid to the first motor;
   a second motor powered by the hydraulic pump to drive a second spreader of the plurality of spreaders;
   a second valve associated with a fluid passage extending between the second motor and the hydraulic pump for controlling the flow of fluid to the second motor;
   an actuator operatively connectable to the deflector plate and operable to effect the extension of the deflector plate into the flow of crop residue; and
   a controller configured to (i) transmit a first control signal to the first valve to control an open/closed state of the first valve so that a speed of the first motor will be either approximately equal to or within a pre-determined range of the speed of the second motor, (ii) transmit a second control signal to the second valve to control the open/closed state of the second valve so that a speed of the second motor will be approximately equal to the speed of the first motor, and (iii) actuate the actuator to effect adjustments in the degree of extension of the deflector plate into the flow of crop residue based upon a comparison between the first control signal and the second control signal.

2. The control system of claim 1, wherein, the first and second motors are connected in parallel to the hydraulic pump.

3. The control system of claim 1, further comprising a first speed sensor associated with the first motor for sensing a rotation speed of the first motor, and a second speed sensor associated with the second motor for sensing a rotation speed of the second motor.

4. The control system of claim 3, wherein the controller is connected to the first and second speed sensors and is configured to adjust the open/closed states of the first and second valves based upon a comparison between speed measurements of the first and second speed sensors.

5. The control system of claim 3, wherein the controller is connected to the actuator and the first and second speed sensors.

6. The control system of claim 1, wherein the first and second valves are connected to different fluid passages.

7. The control system of claim 1, wherein each of the first and second control signals is a pulse width modulated voltage.

8. The control system of claim 1, wherein the controller is configured to operate the first and second motors at substantially the same speed or within a predetermined speed range.

9. The control system of claim 1, wherein the controller is configured to adjust the open/closed states of the first valve and the second valve based upon a comparison between speeds of the first motor and the second motor.

10. A method of controlling a positioning of an adjustable deflector plate of a harvesting combine, such combine having a plurality of spreaders for distributing therefrom crop residue provided thereto, the method comprising:

powering a first motor by a hydraulic pump to drive a first spreader of the plurality of spreaders;

powering a second motor by the hydraulic pump to drive a second spreader of the plurality of spreaders;

transmitting a first control signal to a first valve associated with a fluid passage extending between the first motor and the hydraulic pump to control an open/closed state of the first valve so that a speed of the first motor will be either approximately equal to or within a pre-determined range of the speed of the second motor;

transmitting a second control signal to a second valve associated with a fluid passage extending between the second motor and the hydraulic pump to control the open/closed state of the second valve so that the speed of the second motor will be either approximately equal to or within a pre-determined range of the speed of the first motor;

comparing the first and second control signals; and actuating an actuator to effect adjustments in the degree of extension of the deflector plate into the flow of crop residue based upon the comparison between the first and second control signals to adjust and balance a side-to-side flow of crop residue to the spreaders and the distribution thereby.

11. The method of claim 10, wherein, the first and second motors are connected in parallel to the hydraulic pump.

12. The method of claim 10 further comprising sensing rotation speeds of the first motor and the second motor.

13. The method of claim 12 further comprising adjusting the open/closed states of the first and second valves based upon a comparison between the sensed rotational speeds of the first motor and the second motor.

14. The method of claim 10, wherein each of the first and second control signals is a pulse width modulated voltage.

15. The method of claim 10, wherein the first and second valves are connected to different fluid passages.

16. The method of claim 10, wherein the first and second motors are operated at substantially the same speed or within a predetermined speed range.

17. The method of claim 10 further comprising adjusting the open/closed states of the first valve and the second valve based upon a comparison between speeds of the first motor and the second motor.

* * * * *